(12) United States Patent
Sharpe et al.

(10) Patent No.: US 10,079,705 B1
(45) Date of Patent: Sep. 18, 2018

(54) SYNCHRONIZATION FOR LOW-ENERGY LONG-RANGE COMMUNICATIONS

(71) Applicant: SAMSUNG ELECTRONICS CO., LTD., Suwon-si, Gyeonggi-Do (KR)

(72) Inventors: Jacob C. Sharpe, Cambridge (GB); Fei Tong, Bassingbourn (GB); Myeong-Cheol Shin, Suwon-si (KR); Jeongtaek Lee, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/463,502

(22) Filed: Mar. 20, 2017

(51) Int. Cl.
*H04L 7/04* (2006.01)
*H04L 27/12* (2006.01)
*H04W 28/14* (2009.01)
*H04L 27/26* (2006.01)
*H04W 4/00* (2018.01)
*H04W 4/80* (2018.01)

(52) U.S. Cl.
CPC .......... *H04L 27/12* (2013.01); *H04L 27/2692* (2013.01); *H04W 4/008* (2013.01); *H04W 4/80* (2018.02); *H04W 28/14* (2013.01); *H04L 27/265* (2013.01)

(58) Field of Classification Search
CPC ..... H04L 1/0054; H04L 1/005; H04L 1/0061; H04L 1/1819; H04L 5/0007; H04W 72/0413; H04W 72/0446

USPC ........ 375/362, 141, 146, 147, 341; 370/280, 370/329
See application file for complete search history.

(56) References Cited

U.S. PATENT DOCUMENTS

| | | | |
|---|---|---|---|
| 2013/0229955 A1* | 9/2013 | Xu ......................... | H04W 52/18 370/280 |
| 2013/0235166 A1 | 9/2013 | Jones et al. | |
| 2015/0351092 A1* | 12/2015 | Seo ........................ | H04L 5/0046 370/329 |

\* cited by examiner

*Primary Examiner* — Khai Tran
(74) *Attorney, Agent, or Firm* — F. Chau & Associates, LLC

(57) ABSTRACT

A receiver configured to receive a frequency-modulated transmission having a preamble and a corresponding method are provided, the receiver having a buffer coupled to an input terminal for receiving the transmission, a time-to-frequency transformer coupled to the buffer, an energy aggregator coupled to the transformer, a preamble detector coupled to the aggregator, and a symbol synchronizer coupled to the detector; the method including receiving a sequence of time-domain frequency-modulated samples, transforming the sequence of time-domain samples into a spectrum of frequency-domain data, and matching an actual energy distribution over a plurality of discrete frequencies in the frequency-domain data with an expected energy distribution of the preamble to determine frequency error.

20 Claims, 6 Drawing Sheets

SYNCHRONIZATION FOR LOW-ENERGY LONG-RANGE COMMUNICATIONS

TECHNICAL FIELD

Embodiments of the present inventive concept relate to communications, and more particularly, to a system and method for carrier frequency error determination and symbol synchronization in low-energy long-range communications.

DISCUSSION OF RELATED ART

Wireless communications generally require synchronization at a receiver for accurate decoding. Traditionally, a frame type of synchronization has been achieved via bit correlation after frequency demodulation.

SUMMARY

An exemplary embodiment method is provided for receiver symbol synchronization in a frequency-modulated transmission having a preamble, and includes receiving a sequence of time-domain frequency-modulated samples, transforming the sequence of time-domain samples into a spectrum of frequency-domain data, and matching an actual energy distribution over a plurality of discrete frequencies in the frequency-domain data with an expected energy distribution of the preamble to determine frequency error.

The method may include comparing phase relationships at the plurality of discrete frequencies to determine symbol timing. The method may be applied where matching the expected energy distribution includes combining energies over the plurality of discrete frequencies.

The method may include receiving periodic samples of the frequency-modulated transmission, buffering a plurality of the received samples, performing a block transformation on the plurality of buffered samples into a plurality of frequency bins, comparing combined energies for each of a plurality of subsets of the plurality of frequency bins, each subset corresponding to the relative frequency distribution of energy expected in the preamble, selecting the subset with the greatest combined energy to determine the carrier frequency error of the transmission, and synchronizing receipt of the frequency-modulated transmission in accordance with the selected subset. The method may include comparing the combined energies to a threshold, wherein if the threshold is not exceeded receiving the next periodic samples, or wherein if the threshold is exceeded synchronizing the transmission and determining a fine carrier frequency error.

The method may include determining fractional symbol timing based on relative frequency bin phases. The method may be applied where the block transformation is an n-point time-domain to frequency-domain transform, and fractional symbol timing is determined in accordance with relative frequency bin phases of first and second bins separated by n/2 bins for determining high-precision symbol timing with an ambiguity, a third bin separated from the first bin by n/8 bins and a fourth bin separated from the second bin by n/8 bins for resolving the ambiguity.

The method may be applied where the block transformation is a 64-point Fast Fourier Transform (FFT). The method may include achieving symbol timing synchronization, and beginning demodulation of a main packet based on the achieved synchronization.

The method may include comparing the subset with the greatest combined energy to a threshold, and if the combined energy exceeds the threshold using frequency bin phases to extract symbol timing. The method may be applied where the frequency-modulated transmission is a Bluetooth™ Low-Energy Long-Range transmission, and the preamble includes ten 8 μs repetitions of the 8-bit pattern 00111100.

The method may be applied where the carrier frequency error is based on a fractional bin spacing. The method may include performing an alternate FFT with a ½ bin frequency offset to obtain a carrier frequency error within ¼ bin.

An exemplary embodiment receiver is provided as configured to receive a frequency-modulated transmission having a preamble, the receiver including a buffer coupled to an input terminal for receiving the transmission, a time-to-frequency transformer coupled to the buffer, an energy aggregator coupled to the transformer, a preamble detector coupled to the aggregator, and a symbol synchronizer coupled to the detector.

The receiver may include a start-pattern de-mapper coupled to the synchronizer. The receiver may be configured as an I/Q receiver. The receiver may be configured as a direct conversion receiver, a super-heterodyne receiver, or the like.

The receiver may be applied where the time-to-frequency transformer is an n-point Fast Fourier Transform (FFT) unit. The receiver may be applied where the detector is configured to take squares of absolute values of transformed frequency bins, test summations of candidate bin sets, and compare to a threshold.

The receiver may include an amplifier configured to receive an input signal, an analog-to-digital converter (ADC) connected to the amplifier, and a filter connected to the ADC, where the down-sampler is connected to the filter, and the buffer is connected to the down-sampler and configured for receiving each sample to simultaneously hold a plurality of data samples so a time-domain to frequency-domain transform may be periodically performed on the data within the buffer.

The receiver may be applied where the down-sampler is configured to down-samples to symbol rate. The receiver may be applied where the buffer is a first-in, first-out (FIFO) buffer.

The receiver may include a low-noise amplifier (LNA) configured to receive an input signal, an oscillator configured to generate a cosine wave and a 90-degree offset sine wave, a first mixer connected to the LNA and the oscillator and configured to mix the input with the cosine wave to expose an in-phase (I) portion of the input signal, a second mixer connected to the LNA and the oscillator and configured to mix the input with the sine wave to expose a quadrature-phase (Q) portion of the input signal, a first analog-to-digital converter (ADC) connected to the first mixer, a second ADC connected to the second mixer, a first low-pass filter (LPF) connected to the first ADC, a second LPF connected to the second ADC, a first down-sampler connected to the first LPF and configured for down-sampling the in-phase I data, a second down-sampler connected to the second LPF and configured for down-sampling the quadrature-phase Q data, and at least one buffer connected to the down-samplers and configured for receiving each I/Q sample pair to simultaneously hold a plurality of I/Q data sample pairs so a time-domain to frequency-domain transform may be performed on the data within this buffer periodically.

An exemplary embodiment program storage device is provided tangibly embodying a program of instructions executable by a processor for receiver symbol synchronization in a frequency-modulated transmission having a preamble, the instructions including receiving a sequence of time-domain frequency-modulated samples, transforming the sequence of time-domain samples into a spectrum of frequency-domain data, and matching an actual energy distribution over a plurality of discrete frequencies in the frequency-domain data with an expected energy distribution of the preamble to determine frequency error.

The instruction steps may include comparing phase relationships at the plurality of discrete frequencies to determine symbol timing. The instruction steps may be applied where matching the expected energy distribution includes combining energies over the plurality of discrete frequencies.

The instruction steps may include receiving periodic samples of the frequency-modulated transmission, buffering a plurality of the received samples, performing a block transformation on the plurality of buffered samples into a plurality of frequency bins, comparing combined energies for each of a plurality of subsets of the plurality of frequency bins, each subset corresponding to the relative frequency distribution of energy expected in the preamble, selecting the subset with the greatest combined energy to determine the carrier frequency error of the transmission, and synchronizing receipt of the frequency-modulated transmission in accordance with the selected subset. The instruction steps may include comparing the combined energies to a threshold, wherein if the threshold is not exceeded receiving the next periodic samples, or wherein if the threshold is exceeded synchronizing the transmission and determining a fine carrier frequency error.

The instruction steps may include determining fractional symbol timing based on relative frequency bin phases. The instruction steps may be applied where the block transformation is an n-point time-domain to frequency-domain transform, and fractional symbol timing is determined in accordance with relative frequency bin phases of first and second bins separated by n/2 bins for determining high-precision symbol timing with an ambiguity, a third bin separated from the first bin by n/8 bins and a fourth bin separated from the second bin by n/8 bins for resolving the ambiguity.

The instruction steps may be applied where the block transformation is a 64-point Fast Fourier Transform (FFT). The instruction steps may include achieving symbol timing synchronization, and beginning demodulation of a main packet based on the achieved synchronization.

The instruction steps may include comparing the subset with the greatest combined energy to a threshold, and if the combined energy exceeds the threshold using frequency bin phases to extract symbol timing. The instruction steps may be applied where the frequency-modulated transmission is a Bluetooth™ Low-Energy Long-Range transmission, and the preamble includes ten 8 µs repetitions of the 8-bit pattern 00111100.

The instruction steps may be applied where the carrier frequency error is based on a fractional bin spacing. The instruction steps may include performing an alternate FFT with a ½ bin frequency offset to obtain a carrier frequency error within ¼ bin.

BRIEF DESCRIPTION OF THE DRAWINGS

Aspects of the present inventive concept may become apparent and appreciated upon consideration of the following description of exemplary embodiments when taken in conjunction with the accompanying drawings, in which.

DETAILED DESCRIPTION

Bluetooth™ Low-Energy (BLE) Long-Range is a wireless communications protocol expected to operate at low Signal-to-Noise Ratios (SNR) such as around zero decibels (dB). Using an 8 µs repetition period, the BLE Long-Range preamble includes 10 repetitions of the 8-bit pattern 00111100. Various methodologies for determining carrier frequency error and achieving symbol synchronization are possible. Here, a coarse carrier frequency error may be determined through finding the location of a best matching frequency bin pattern prior to thresholding and synchronization, while a fine carrier frequency error may be determined through thresholding and synchronization.

Symbol synchronization (Sync) may be approached by a correlation of the received signal with an ideal realization of the signal. This correlation could be performed in the Cartesian-domain or in the frequency-domain for each candidate Sync position. A correlation of sufficient magnitude would indicate Sync, and at the maximum correlation value provide symbol timing.

A Cartesian-domain correlation has excellent performance at low SNR, but the complexity of the correlator increases as $n^2$ so it quickly becomes an expensive solution for long sequences. Cartesian correlation is desensitized by frequency errors, which may necessitate the use of a matched filter bank to consider multiple frequency offset candidates thereby adding to the complexity.

A frequency-domain correlation, which may involve a phase differentiation (e.g., FM demodulation) of the received I/Q data and comparison against the expected bit pattern, is efficient at high SNR and robust to frequency error. It has been used for standard Bluetooth™ (BT) and Bluetooth™ Low-Energy (BLE). Like Cartesian-domain correlation, its complexity rises as $n^2$. It is less effective at low SNR as there is significant loss of SNR in the I/Q to frequency-domain conversion when the operating SNR is low.

In Orthogonal Frequency-Division Multiplexing (OFDM) such as IEEE 802.11 OFDM PHY, the preamble has a frequency structure resulting in time-domain repetition. As with OFDM modulation, Fast Fourier Transform (FFT) methods may be used to achieve time/frequency synchronization in BLE Long-Range. However, the preamble frequency structure such as tone spacing and tone power for BLE Long-Range is quite different.

Figure 1:
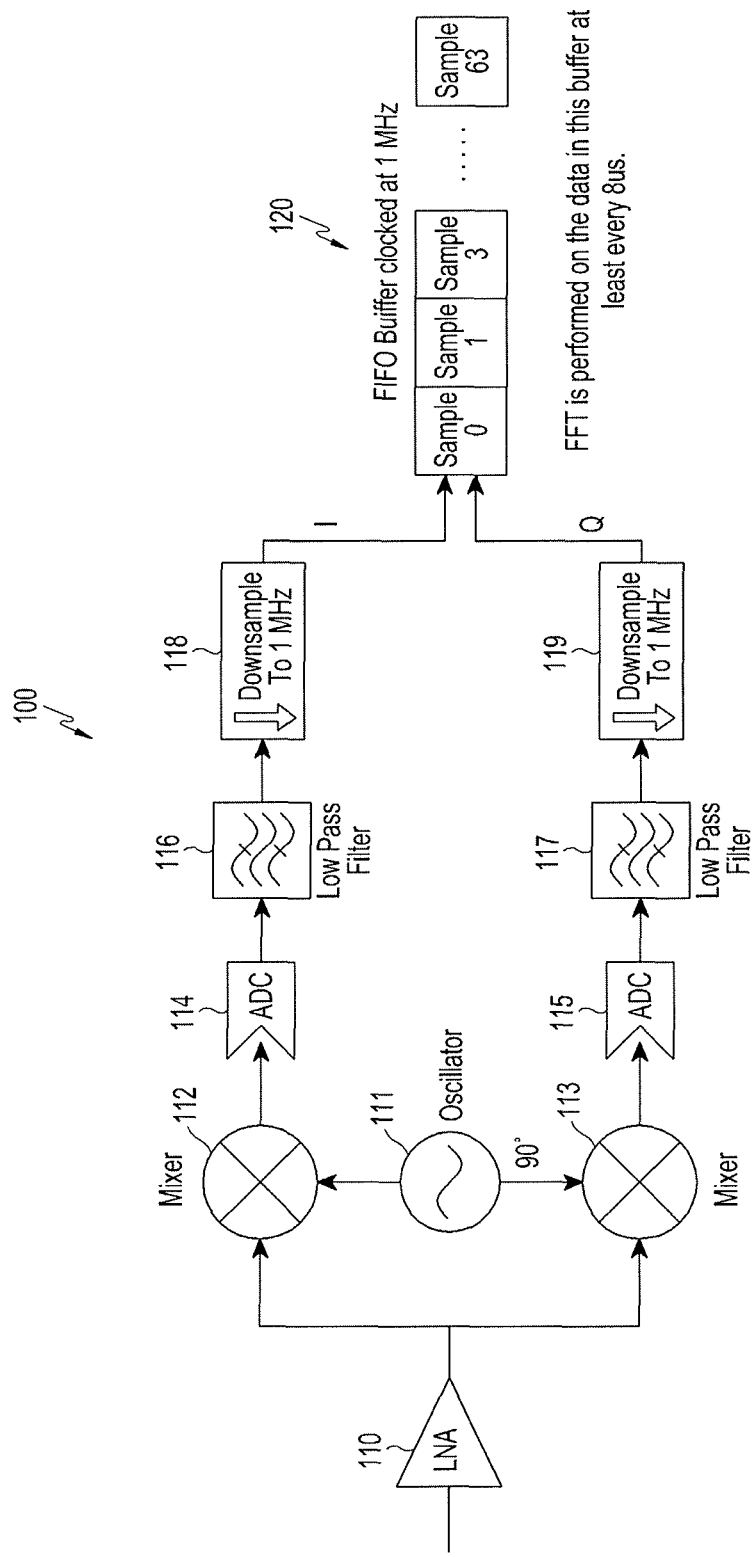
FIG. 1 is a schematic block diagram of an I/Q receiver in accordance with an exemplary embodiment of the present inventive concept.

As shown in FIG. 1, an exemplary embodiment I/Q receiver is indicated generally by the reference numeral 100. The I/Q receiver 100 includes a low-noise amplifier (LNA) 110 configured to receive an input signal, an oscillator 111 configured to generate a cosine wave and a 90-degree offset sine wave, a first mixer 112 connected to the LNA and the oscillator and configured to mix the input with the cosine wave to expose the in-phase (I) portion of the input signal, a second mixer 113 connected to the LNA and the oscillator and configured to mix the input with the sine wave to expose the quadrature-phase (Q) portion of the input signal, a first analog-to-digital converter (ADC) 114 connected to the first mixer, a second ADC 115 connected to the second mixer, a first low-pass filter (LPF) 116 connected to the first ADC, a second LPF 117 connected to the second ADC, a first down-sampler 118 connected to the first LPF and configured for down-sampling the in-phase I data to 1 MHz, a second down-sampler 119 connected to the second LPF and configured for down-sampling the quadrature-phase Q data to 1 MHz, and buffer 120, such as a first-in first-out (FIFO) buffer, connected to the down-samplers and configured for receiving each I/Q sample pair to simultaneously hold 64 I/Q data sample pairs so an FFT may be performed on the data within this buffer at least every 8 μs.

The exemplary embodiment receiver 100 uses a direct conversion receiver architecture capable of implementing the inventive concept, although the inventive concept is not limited to this type of architecture. For example, a super-heterodyne type of receiver or the like may be used in alternate embodiments. At the LNA 110, the signal is received in the 2.4-2.48 GHz Industrial, Scientific and Medical (ISM) band, which is next amplified, mixed, and sampled. The signal is then digitized and at least low-pass filtered using a filter having sufficiently wide bandwidth, here 1.3 MHz, to allow passage of the BLE Long Range signal including any frequency offset prior to down-sampling. Thus, the inventive concept works on the buffered I/Q data, down-sampled in this exemplary embodiment to 1 million samples per second (MSample/s).

Figure 2:
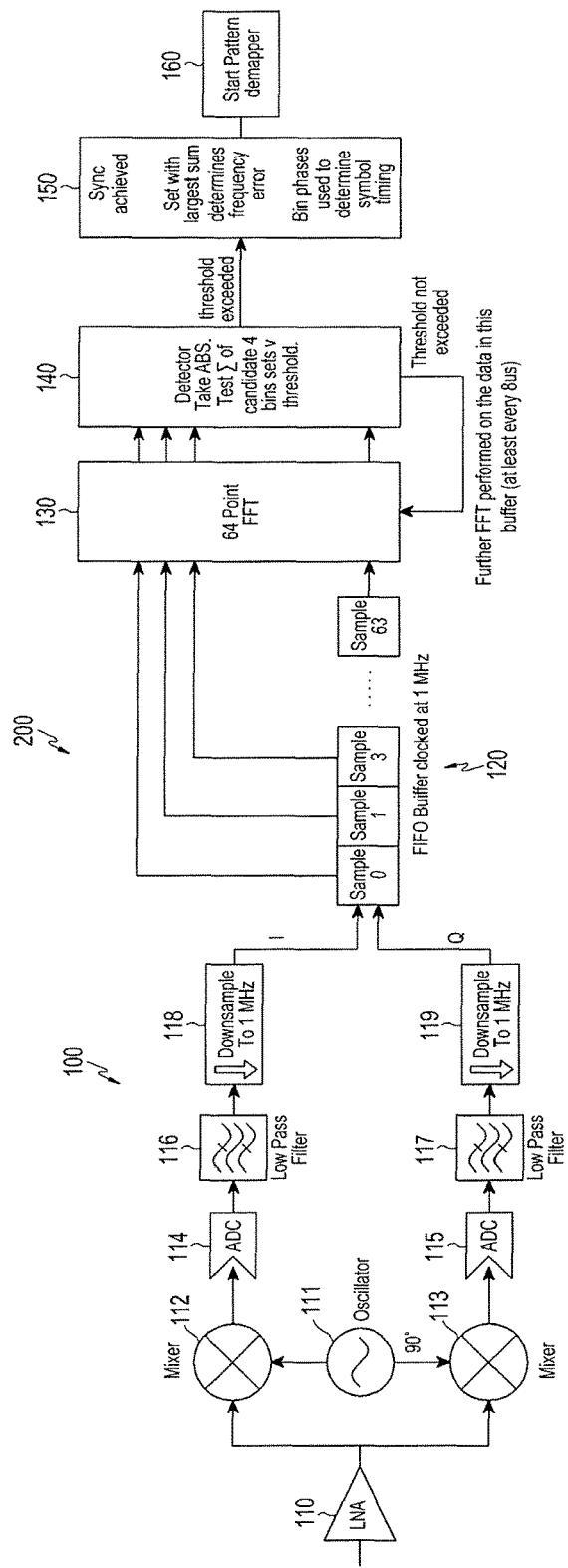
FIG. 2 is a schematic block diagram of an I/Q receiver with FFT detector in accordance with an exemplary embodiment of the present inventive concept.

Turning to FIG. 2, an exemplary embodiment I/Q receiver is indicated generally by the reference numeral 200. The I/Q receiver 200 is similar to the I/Q receiver 100 of FIG. 1, so duplicate description may be omitted. In addition, the I/Q receiver 200 includes a 64-point FFT unit 130 connected to the buffer 120. The buffer 120 may be a FIFO buffer with serial access, and/or support simultaneous parallel access to all of its 64 I/Q sample stores. The receiver 200 further includes a detector 140 configured to take absolute (ABS) values (and/or squares) of the FFT bins, test summations (Z) of candidate 4-bin (or alternatively 6-bin) sets, and compare to a threshold. The detector, in turn, is connected to a synchronizer 150. If the threshold is not exceeded, the detector signals the FFT device 130 and awaits the next FFT; but when the threshold is exceeded, the detector passes a Sync signal to the synchronizer 150. Upon receipt of the Sync signal, the synchronizer 150 enters a Sync-achieved state, where the 4 (or alternatively 6) bin set with the largest summation is used to determine the frequency error, and the bin phases are used to determine symbol timing. A start-pattern de-mapper 160 is connected to the synchronizer, in turn, and configured to de-map the synchronized start-pattern data.

Figure 3:
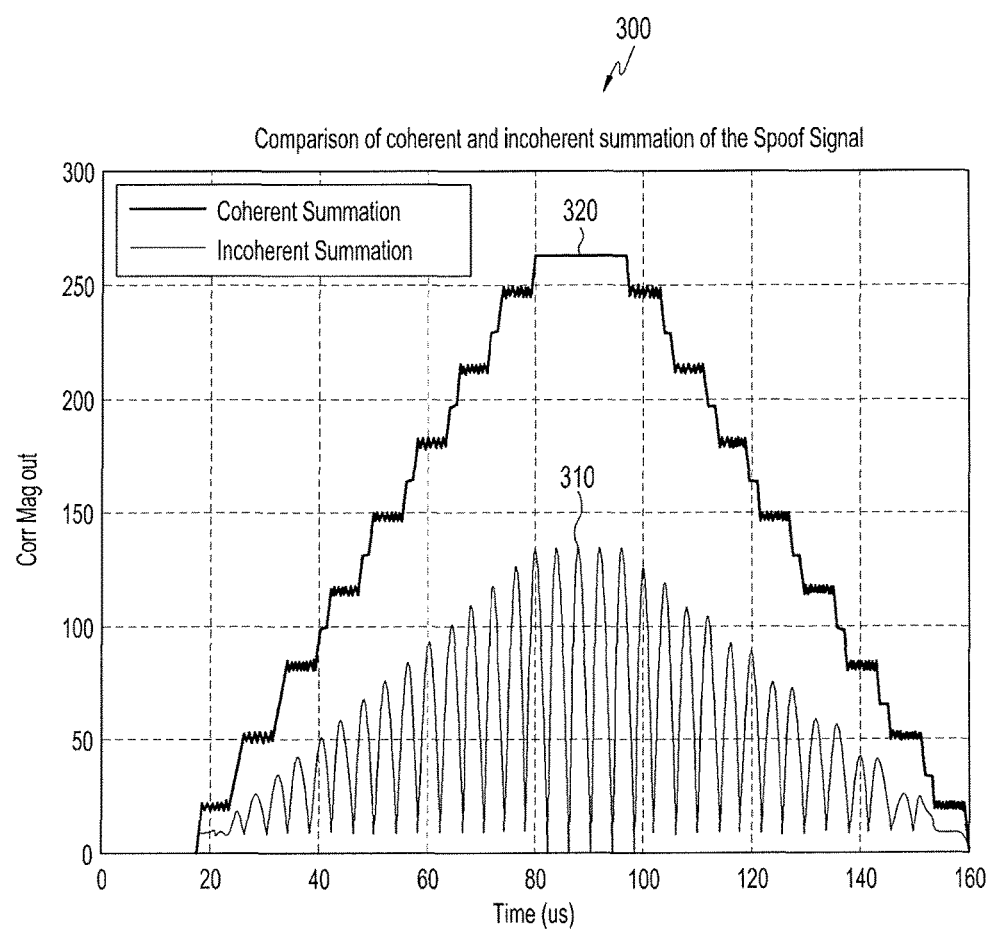
FIG. 3 is a graphical diagram comparing coherent and incoherent summation of a spoof signal received by an I/Q receiver with FFT detector in accordance with an exemplary embodiment of the present inventive concept.

Turning now to FIG. 3, a graphical comparison of coherent (e.g., in-phase) and incoherent/non-coherent (e.g., out-of-phase) summation for a spoof signal received by an exemplary I/Q receiver, such as the I/Q receiver 200 of FIG. 2, is indicated generally by the reference numeral 300. Here, the coherent summation 310 has significantly lower continuous and peak correlated magnitude output than the incoherent summation 320.

When summing the result vectors of successive FFT frames together, one can just add the magnitudes, which is an incoherent sum, or sum the complex vectors, which is a coherent sum. With the coherent combination, any stationary sinusoids with a frequency mid-way between 2 FFT bins across 2 successive FFT frames, for example, would cancel out instead of summing in spectrum. Here, the significantly lower peak magnitude of the coherent summation 310 indicates that the frequency bins are not in perfect phase. Here, coherent indicates that a phase relationship is enforced on the bins. Thus, if the complex vectors are summed, all of the phases must be equal to get the maximum sum. The phase relationship of the bins changes depending on the starting point of the FFT, and only for one point will all the phases be equal. However, the spoofing signal chosen has a phase relationship that would never exist for a real signal, but all phase information is neglected by taking the absolute value or squaring.

Use of the inventive concept may be detected by sending such a spoof signal before the main waveform or normal packet in a throughput test. A product deploying the inventive concept would Sync on such an amplitude-modulated (AM) spoof signal but then fail to decode the access code and packet. The result should be a detectable loss in throughput. A method not employing the inventive concept should not Sync to the spoofing signal and thus have no loss in throughput versus its standard performance. Although this spoof signal is for six (6) bins, details of how many bins such as four (4), and which bins are used such as the inner four, and how the bins are summed such as sum of squares or absolute values, may lead to different optimal spoof signals in alternate embodiments.

Figure 4:
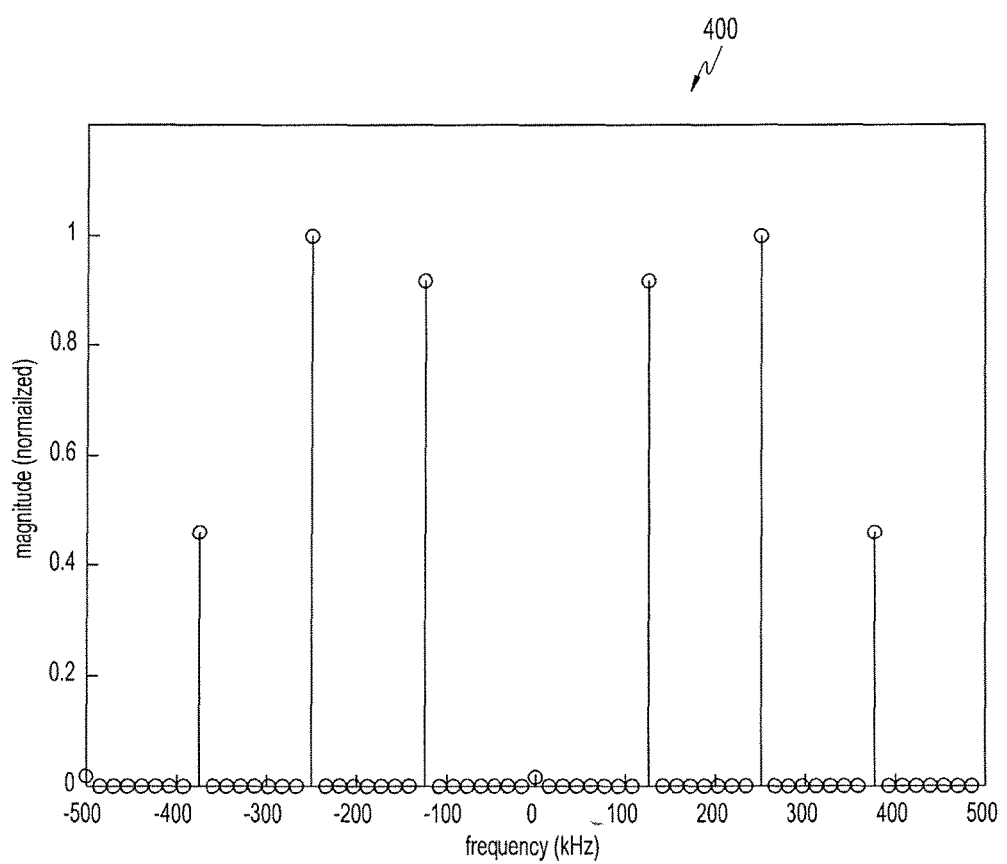
FIG. 4 is a graphical diagram of FFT bins for the spoof signal received by an I/Q receiver with FFT detector in accordance with an exemplary embodiment of the present inventive concept.

As shown in FIG. 4, a graphical representation of normalized magnitudes for all 6 FFT bins of a real BLE long range signal received by an exemplary I/Q receiver like that of FIG. 2 is indicated generally by the reference numeral 400. The normalized magnitudes of the FFT bins are the same for the real BLE long range signal compared to the used bins of the spoof signal. Although all 6 frequency bins are shown (i.e., −375 kHz, −250 kHz, −125 kHz, +125 kHz, +250 kHz, +375 kHz) over the relevant frequency spectrum, either all of these or fewer, such as the middle 4 frequency bins (i.e., −250 kHz, −125 kHz, +125 kHz, +250 kHz), may be utilized in alternate embodiments.

The BLE Long-Range preamble is 10 repetitions of the bit sequence 00111100, which is modulated as a Gaussian Frequency Shift Keying (GFSK) symbol at a symbol rate of 1 million symbols per second (MSymbol/s) with a modulation index of 0.5 and a bandwidth-time (BT) product of 0.5. This is substantially the same BT product as a standard BLE signal. In the frequency-domain, this BLE Long-Range preamble signal consists of 6 tones at the ±125 kHz, ±250 kHz, ±375 kHz frequency locations. The preamble repetition helps to concentrate the spectral energy in a subset of bins. The inventive concept hones in on this concentration of spectral energy. The exemplary spectrum is for a frequency error of 0 kHz, but the method is robust for frequency error. The effect of a frequency error is to shift the 6 occupied bins substantially equally. If the bins are spaced at 15.625 kHz, an error of 46.875 kHz would shift the entire pattern 3 bins to the right (i.e., the occupied bins would change from 9, 17, 25, 41, 49, and 57 to 12, 20, 28, 44, 52, and 60).

Figure 5:
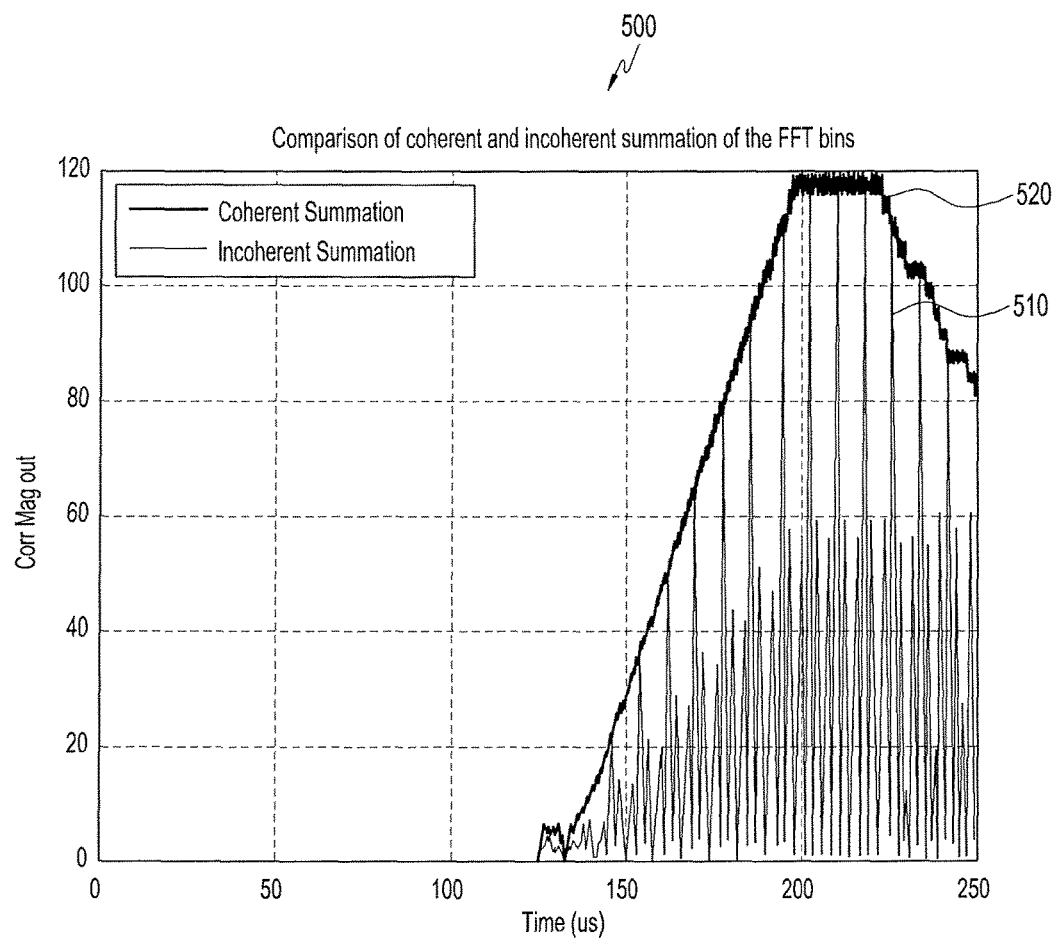
FIG. 5 is a graphical diagram comparing coherent and incoherent summation of FFT bins for a signal received by an I/Q receiver with FFT detector in accordance with an exemplary embodiment of the present inventive concept.

Turning to FIG. 5, a graphical comparison of coherent and incoherent summation of the FFT bins for a BLE Long Range preamble signal received by an exemplary I/Q receiver, such as the I/Q receiver 200 of FIG. 2, is indicated generally by the reference numeral 500. Here, the coherent summation 510 has substantially the same peak correlated magnitude output as the incoherent summation 520.

A timewise correlation of two signals can be related to the multiplication of their Fourier transforms through the convolution theorem. Thus, the correlation of the received I/Q sequence signal with the ideal I/Q sequence may be obtained by multiplying the FFT of the received I/Q with the FFT of the ideal signal. As the ideal signal consists of just 6 bins, one need only consider these bins in the multiplication for a given frequency error. The timewise correlation will have strong peaks every 8 μs. With the FFT, this information is contained in the phases of the 6 tones. Coherently combining the FFT output with a phase relationship corresponding to a unique sampling time produces the desired result for a timewise correlation. Following this methodology, the FFT could either be performed many times to test all starting times, or the results of one FFT could be considered with the tone phases of a series of starting time candidates.

The present exemplary embodiment combines the squared magnitudes of the FFT bins. This may reduce the SNR of the resulting correlation, but greatly simplifies the processing as all of the symbol time candidates may be considered simultaneously. Once a BLE Long-Range signal has been detected, the symbol time can then be calculated from the phases of the FFT bins.

Coherent combination would enforce a particular phase relationship on the tones. So, one would multiply the tones from the FFT by "ideal tones" known from the transmitted sequence and then sum. Whereas incoherent combination involves summing the squares of the tones so the phase information is lost. Correlation would always involve a multiplication, but one could modify the method to work on the absolute values. Squaring is preferred because absolute values can be vulnerable to obscure FFT artefacts such as from ramping the signal.

A comparison of coherent and incoherent summation may be achieved by summing the squares or the absolute values, but it is not limited thereto. All of the frequency error candidates are then accounted for by considering different sets of summed bins, as offset by the frequency error.

Figure 6:
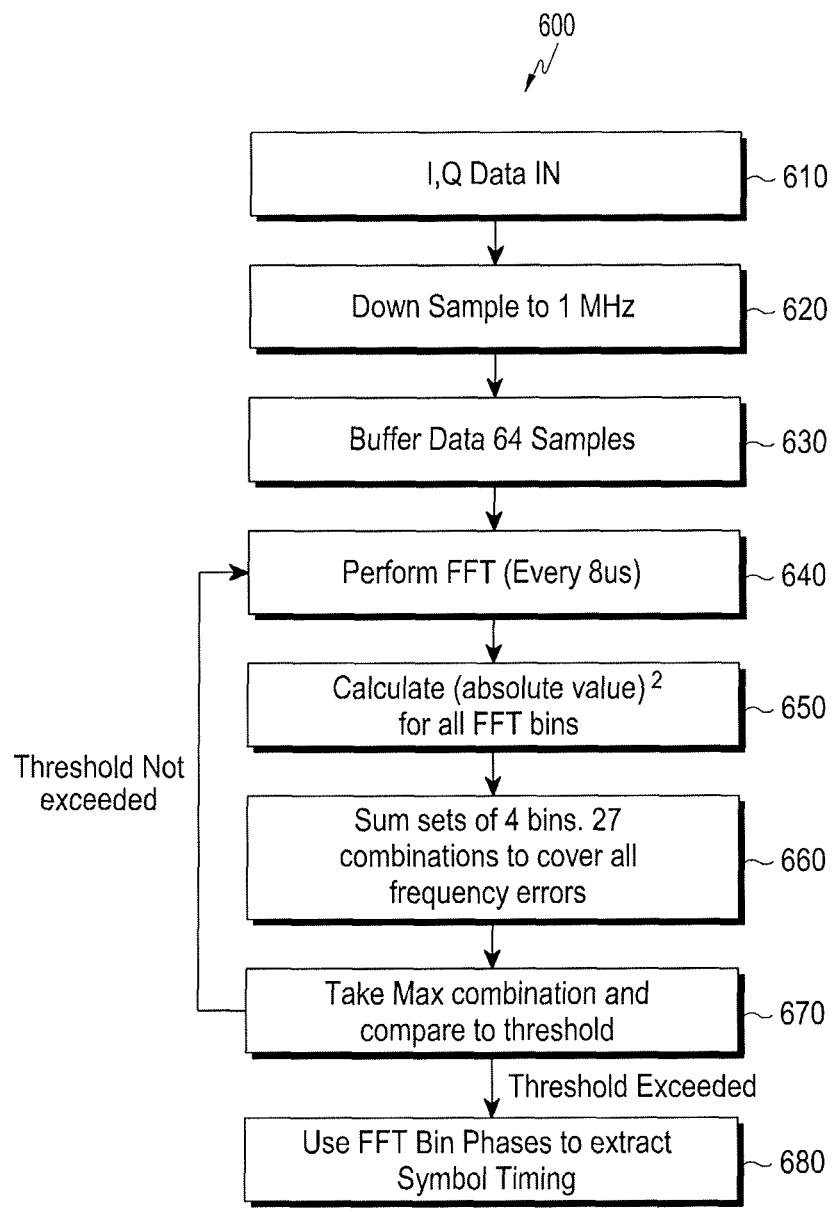
FIG. 6 is a schematic flow diagram for a method of operating an I/Q receiver with FFT detector in accordance with an exemplary embodiment of the present inventive concept.

Turning now to FIG. 6, a method of operating an I/Q receiver for frequency error estimation and symbol synchronization in low-energy long-range communications is indicated generally by the reference numeral 600. Here, an input block 610 receives I/Q valued data and passes control to a function block 620. The block 620 down-samples the data to 1 MHz and passes control to a function block 630. The block 630 buffers 64 samples of the data and passes control to a function block 640. The block 640 performs a 64-point FFT on the samples at least every 8 μs into 64 FFT bins and passes control to a function block 650. The block 650 calculates a square of the absolute value for all FFT bins and passes control to a function block 660. The block 660 sums sets of 4 (or 6) bins over 27 combinations to cover all frequency errors and passes control to a decision block 670. The block 670 takes the maximal combination and compares it to a threshold, looping control back to block 640 if the threshold is not exceeded, but passing control on to a function block 680 if the threshold is exceeded. The block 680, in turn, uses the FFT bin phases to extract Symbol timing.

Thus, the processing flow of the inventive concept operates on a buffer of I/Q data that has been down sampled to 1 MHz. 64 samples are stored in the buffer, which is 64 μs of signal while the total preamble length is 80 μs. Every 8 μs or less, an FFT is performed on this buffered data; the resulting output will be the real or in-phase and imaginary or quadrature-phase values of the 64 FFT bins. The sum of the absolute values squared of all of these bins is then taken. All bins are used since different frequency error candidates must typically be considered. The BLE specification allows for a transmitter to be in error by up to ±150 kHz, while the receiver itself may have a frequency error of ±50 kHz. Such large potential frequency errors must be accommodated because Bluetooth™ was originally specified for relatively inexpensive hardware devices, and backward compatibility remains desirable.

Thus, frequency errors up to ±200 kHz are considered, and a 1.3 MHz filter bandwidth suffices as being 300 kHz greater than the 1 MHz down-sampled data rate. The bin spacing is 1 MHz/64=15.625 kHz, so this calls for considering bin offsets of 200/15.625=12.8 bins. As only integer bins can be considered, this is ±13 bins. Note that the tone spacing (125 kHz) is a multiple of the bin spacing (8*15.625 kHz), which allows for a simpler implementation since all of the bins can be shifted by a fixed number depending upon the frequency offset.

Due to the ten 8 μs repetitions of the 00111100 8-bit pattern in the preamble for BLE Long-Range, the signal energy is concentrated in 6 tones at ±125 kHz, ±250 kHz, and ±375 kHz. Embodiments of the present inventive concept may use all six of these tones, or alternately just the center four (i.e., ±125 kHz and ±250 kHz) since the outer two (i.e., +375 kHz) should be of relatively lower magnitude. For the 0 Hz offset bin, the absolute values squared of the bins (17, 25, 41, 49) are combined when using the central 4 of the 6 bins. Using the absolute values squared is one way of assuring non-negative results for complex-valued I/Q samples. For ease of explanation regardless of the offset frequency error, the 6 bins resulting from the preamble signal may be thought of as any set of 6 bins (out of 64 in this embodiment) that could be seen in a frequency-domain plot through a mask or ruler with 6 equidistant holes spaced at 125 kHz intervals.

After the 27 candidates have been calculated, the largest candidate is compared against a threshold. If the threshold is exceeded, Sync is detected. The two outer bins are not used in this exemplary embodiment since they contain only half the signal strength of the inner bins, and their inclusion may exacerbate the detection of false maximums, such as one 8 bins offset from the true frequency error, which due to the presence of noise might have a slightly larger magnitude than that of the true frequency error. By removing the 2 outer bins, only 2 of the 4 remaining bins overlap in this case as compared to 4 of the 6 original bins.

Setting or adjusting the sync threshold requires care. At low powers with low SNR, a fixed threshold may be used. As the signal power increases, the threshold should increase or false Sync can be detected before the buffer contains 64 samples of preamble. This is done here by summing the absolute values squared of the buffered samples to give a signal power (P) estimate, where the threshold is then set according to the following relationship:

$$\text{thresh} = \max(\text{fixed}_{threshold}, \text{grad\_threshold} * P - \text{threshold\_offset}) \quad \text{(Eqn. 1)}$$

In BLE Long-Range, spacing between preamble tones is coincidentally fixed by the standard to 125 kHz apart. If a different FFT length were used, the interval between samples might not be 8 μs but would preferably be an integer number of bins apart. That is, FFT length and downsampling rate are linked.

Frequency offsets at a half bin spacing, for example, will reduce the magnitude of the candidates by about 3 dB. To avoid this, alternate FFT's may be performed with a ½ bin frequency offset. As the preamble length is 10 repetitions and only 8 are used for the FFT in this exemplary embodiment, one FFT will then have a frequency error of less than ¼ bin.

I/Q data is used because I/Q takes advantage of sine and cosine signals being mathematically orthogonal to each other, and therefore separable with minimal effort. With appropriate care, one signal can be modulated with a cosine wave and the other with a sine wave that is basically a delayed version of the cosine wave, where these two signals remain separable at the receiver even though their frequency spectrums overlap. I/Q pairs are the real and imaginary components of the complex-valued transmitted baseband signal. "I/Q data" refers to the real or in-phase (I) and imaginary or quadrature-phase (Q) samples of the constellation for the modulation type used. There may be various pairs of I/Q "samples" that occur during interim processing. Although a complex I/Q data signal is used in the exemplary embodiments, it shall be understood that alternate embodiments may use different signals, such as multiple signals that are separated in time, frequency, phase, and/or quadrature.

An FFT is performed on the received I/Q data using an appropriate sample rate, such as the symbol rate. This places substantially all of the signal energy into just the 6 bins allowing a significant increase in SNR. By summing the energy in various candidate sets of the 6 bins, or of the inner 4 bins in some embodiments, it is possible at low SNR to determine both the presence of a BLE Long-Range signal as well as its frequency error. The relative phases of the bins can then be used to determine fractional symbol timing with respect to the FFT window. This information is sufficient to achieve symbol synchronization and begin demodulation of the main BLE Long-Range packet.

Exemplary embodiments of the inventive concept use an FFT per block of samples to achieve time and frequency synchronization. This exploits the relatively low complexity of FFTs while maintaining de-noising gain. The relatively low complexity using FFTs is due to the reduced increase in complexity as n log n for sequences of length n, which is significantly less than for other methods that increase as $n^2$. In an exemplary embodiment, 64 samples of I/Q data are stored where each I/Q data sample uses a 9-bit word length for I and a 9-bit word length for Q. Each FFT block uses the n=64 I/Q data samples covering 8 repetitions of the 8-bit BLE preamble pattern 00111100. In alternate embodiments, a block may include a different number n of I/Q data samples. For example, n=80 could cover all 10 repetitions of the preamble.

The inventive concept may further use a combining scheme to make the detection more robust to frequency offsets. This balances the difficulties of frequency error estimation with signal detection. By magnitude combining the candidate bins, SNR may be somewhat sacrificed to allow the consideration of multiple frequency error and sampling time candidates in a highly efficient manner. Nonetheless, the SNR remains sufficient to successfully detect BLE Long-Range packets with a very low false detection rate.

Thus, embodiments of the inventive concept require less hardware to implement than time-domain correlation schemes. Time-domain correlation given de-sensitization of the correlation by frequency error would require a large number of simultaneous correlations to be performed, such as 20 for example. Time-domain correlation might otherwise offer better performance at low SNR, but insufficient benefit would be realized since performance is limited by the bit error rate (BER) for both Sync methodologies. It shall be understood that this is the BER of the access code and payload demodulation, even with ideal Sync.

The inventive concept has a substantially lower SNR threshold for a successful detection then frequency-domain correlation. In theory, frequency-domain correlation is simpler as it avoids an FFT, but hardware implementation is likely to be at least as expensive. As an exemplary embodiment of the present inventive concept can determine symbol timing using the tone phases, it is only required every 8 μs. For frequency-domain correlation, the correlation would be determined far more frequently such as per sample or faster than the 1 MSample/s in the buffer since, there, the correlation peak or the like is used to derive the symbol timing.

The method of the present inventive concept makes use of the energy in the BLE Long-Range preamble being concentrated at 6 tones (i.e., −375 kHz, −250 kHz, −125 kHz, +125 kHz, +250 kHz, +375 kHz). These have a specific magnitude relationship (i.e., 0.47, 1, 0.91, −0.91, 1, −0.47) at sample offset t=0. By adjusting the magnitude relationship, a spoofing signal waveform may be constructed that while it should be detected by the FFT synchronization algorithm, should not cause either I/Q correlation or frequency-domain correlation to detect synchronization. A possible candidate for this spoofing signal would be [0.5 1 0.9 −0.9 −1 −0.5]. This signal uses amplitude modulation (AM), so it would not be seen by a frequency synchronizer and thus the response of an I/Q correlation should be substantially reduced.

The next step of the inventive concept is to extract the symbol timing. This can be done from the phases of the FFT bins. The phases of the FFT bins vary with starting time as outlined below. t=−0 is exact alignment with the 00111100*8 pattern where t is the offset in input buffer samples from that alignment. t's range is 0 to 63, but as the FFT is repeated at least every 8 μs, the correction is only needed over an 8 sample (8 μs) range. The bin numbers (e.g., −8) are given relative to the center bin. This center bin includes the offset for the selected frequency error candidate.

$$Y[-16]=-t/2\pi,\ Y[-8]=-t/4\pi,\ Y[8]=\pi+t/4\pi,\ Y[16]=t/2\pi \quad \text{(Eqn. 2)}$$

The difference between Y[−16] and Y[16] might provide the greatest accuracy, but will change through 8π in 8 samples providing an ambiguous answer. The phase difference between any two pairs of bins where the bins of each pair are each separated by 8 bins can be used to resolve the ambiguity. The phase difference between bins (−16 & −8) and (8 & 16) is used by calculating:

$$\text{Coarse Timing} = \frac{4}{\pi}\text{angle}(Y[-8]*\overline{Y[-16]} - Y[16]*\overline{Y[8]}) \quad \text{(Eqn. 3)}$$

$$= \frac{4}{\pi}\text{angle}\left(e^{-j\frac{t\pi}{4}} \times e^{j\frac{t\pi}{2}} - e^{j\frac{t\pi}{2}} \times e^{-j(\pi+\frac{t\pi}{4})}\right) \quad \text{(Eqn. 4)}$$

$$= \frac{4}{\pi}\text{angle}\left(e^{j\frac{t\pi}{4}} + e^{j\frac{t\pi}{4}}\right) = \frac{4}{\pi}\text{angle}\left(2e^{j\frac{t\pi}{4}}\right) = t \quad \text{(Eqn. 5)}$$

To get a high accuracy estimate for the symbol timing, $$\theta = \frac{1}{\pi}\text{angle}(Y[-16]*\overline{Y[-16]}) \quad \text{(Eqn. 6)}$$

is used to derive 4 timing candidates of 0+θ, 2+θ, 4+θ and 6+θ. The closest candidate to the coarse timing will then recover the symbol timing. By retaining fractional accuracy, this gives an accurate symbol timing even with decimation to 1 MHz.

Fractional symbol timing may be determined based on relative frequency bin phases where the block transformation is an n-point time-domain to frequency-domain transform. Here, the fractional symbol timing is determined in accordance with relative frequency bin phases of first and second bins separated by n/2 bins for determining high-precision symbol timing with an ambiguity, a third bin separated from the first bin by n/8 bins and a fourth bin separated from the second bin by n/8 bins for resolving the ambiguity. This bin spacing is applicable to BLE long range with the given FFT length.

The inventive concept is not limited to the direct conversion receiver architecture illustrated, and could be applied to other receiver architectures such as super-heterodyne receivers or the like. The choice of FFT length and buffering rate is arbitrary. Combinations which make the tone spacing an integer multiple of the bin spacing will make the processing simpler since the frequency candidates are integer shifts, but with added complexity non-integer fractional shifts may be accommodated.

It is also possible to sum the absolute values of the bins and compare this to a threshold and to make use of the outer two bins. If using the outer bins for offsets larger than 7, then a circular shift ("circshift") operation may be applied to any bins below 0 or above 63 since the tone may alias. This is feasible since the filtering before the buffering should not be exactly 1 MHz, but wider (e.g., 1.3 MHz) with allowance for any frequency error.

There are numerous algorithm choices for setting the threshold. Additionally, there are numerous choices for establishing the sampling time from the FFT bin phases using different combinations of the tones.

Accordingly, the present inventive concept reduces the complexity of the correlator to increasing as n log n using a FFT per block of samples to achieve time and frequency synchronization, rather than increasing as $n^2$ as in each of the traditional Cartesian correlation and the traditional frequency-domain correlation. This facilitates a significant reduction in correlator complexity for large n. It shall be understood that performing a single FFT multiple times is still possible, versus performing a block FFT fewer times.

Although exemplary embodiments of the present inventive concept have been shown and described, it shall be understood that those of ordinary skill in the pertinent art may make changes therein without departing from the scope, principles, and spirit of the present inventive concept as defined by the appended claims and their equivalents.

What is claimed is:

1. A method for symbol synchronization in a frequency-modulated transmission having a preamble, the method comprising:
   receiving the frequency-modulated transmission and obtaining a sequence of time-domain samples of the preamble;
   transforming the sequence of time-domain samples into a spectrum of frequency-domain data over discrete frequencies arranged in a plurality of frequency bins;
   comparing combined energies for each of a plurality of subsets of the frequency bins, each subset corresponding to a relative frequency distribution of energy expected in the preamble at a respective carrier frequency;
   selecting the subset of the frequency bins with the greatest combined energy, the selected subset being indicative of a carrier frequency error of the transmission; and
   synchronizing receipt of the frequency-modulated transmission in accordance with the selected subset of the frequency bins.

2. The method of claim 1, wherein the synchronizing receipt of the frequency-modulated transmission in accordance with the selected subset of the frequency bins comprises comparing phase relationships at the plurality of discrete frequencies to determine symbol timing.

3. The method of claim 1 wherein the frequency-modulated transmission is a Gaussian frequency-shift-keying (FSK) modulated transmission.

4. The method of claim 1, wherein the receiving of the frequency-modulated transmission comprises:
   receiving a plurality of periodic samples of the frequency-modulated transmission;
   buffering the plurality of the received periodic samples; and
   wherein the transforming comprises:
   performing a block transformation on the plurality of buffered periodic samples into the plurality of frequency bins.

5. The method of claim 4, further comprising comparing the combined energies to a threshold, wherein if the combined energies does not exceed the threshold, receiving the next periodic samples, or wherein if the combined energies exceeds the threshold, synchronizing the transmission and determining a fine carrier frequency error.

6. The method of claim 1, further comprising determining fractional symbol timing based on relative frequency bin phases.

7. The method of claim 4, wherein:
   the block transformation is an n-point time-domain to frequency-domain transform, and
   fractional symbol timing is determined in accordance with relative frequency bin phases of first and second bins separated by n/2 bins for determining high-precision symbol timing with an ambiguity, a third bin separated from the first bin by n/8 bins and a fourth bin separated from the second bin by n/8 bins for resolving the ambiguity.

8. The method of claim 4, wherein the block transformation is a 64-point Fast Fourier Transform (FFT).

9. The method of claim 1, further comprising:
   achieving symbol timing synchronization; and
   beginning demodulation of a main packet based on the achieved symbol timing synchronization.

10. The method of claim 4, further comprising:
    comparing the greatest combined energy of the subset to a threshold; and
    if the greatest combined energy exceeds the threshold, using frequency bin phases to extract symbol timing.

11. The method of claim 1, wherein the frequency-modulated transmission is a Bluetooth™ Low-Energy Long-Range transmission, and the preamble includes ten 8 μs repetitions of the 8-bit pattern 00111100.

12. The method of claim 1 wherein the carrier frequency error is based on a fractional bin spacing.

13. The method of claim 1, further comprising performing an alternate FFT with a ½ bin frequency offset to obtain a carrier frequency error within ¼ bin.

14. A receiving apparatus for symbol synchronization in a frequency-modulated transmission having a preamble, the receiving apparatus comprising:

a receiver configured to receive the frequency-modulated transmission and obtain therefrom a sequence of time-domain samples of the preamble; and a processor configured to:
- transform the sequence of time-domain samples into a spectrum of frequency-domain data over discrete frequencies arranged in a plurality of frequency bins,
- compare combined enemies for each of a plurality of subsets of the frequency bins, each subset corresponding to a relative frequency distribution of energy expected in the preamble at a respective carrier frequency,
- select the subset of the frequency bins with the greatest combined energy, the selected subset being indicative of a carrier frequency error of the transmission, and
- synchronize receipt of the frequency-modulated transmission in accordance with the selected subset of the frequency bins.

15. The receiving apparatus of claim 14, wherein the processor is further configured to compare phase relationships at the plurality of discrete frequencies to determine symbol timing.

16. The receiving apparatus of claim 14, wherein the frequency-modulated transmission is a Gaussian FSK modulated transmission.

17. The receiving apparatus of claim 14, wherein:
the receiver is further configured to receive a plurality of periodic samples of the frequency-modulated transmission; and
the processor is further configured to:
buffer the plurality of the received periodic samples to a buffer,
perform a block transformation on the plurality of buffered periodic samples into the plurality of frequency bins.

18. The receiving apparatus of claim 17, wherein the processor is further configured to compare the combined energies to a threshold, wherein if the combined energies does not exceed the threshold, the processor is further configured to receive the next periodic samples, and wherein if the combined energies exceeds the threshold, the processor is further configured to synchronize the transmission, and determine a fine carrier frequency error.

19. The receiving apparatus of claim 14, wherein the processor further configured to determine fractional symbol timing based on relative frequency bin phases.

20. A program storage device tangibly embodying a program of instruction steps executable by a processor for receiver symbol synchronization in a frequency-modulated transmission having a preamble, the instruction steps comprising:
- receiving the frequency-modulated transmission and obtaining a sequence of time-domain samples of the preamble;
- transforming the sequence of time-domain samples into a spectrum of frequency-domain data over discrete frequencies arranged in a plurality of frequency bins;
- comparing combined energies for each of a plurality of subsets of the frequency bins, each subset corresponding to a relative frequency distribution of energy expected in the preamble at a respective carrier frequency;
- selecting the subset of the frequency bins with the greatest combined energy, the selected subset being indicative of a carrier frequency error of the transmission; and
- synchronizing receipt of the frequency-modulated transmission in accordance with the selected subset of the frequency bins.

* * * * *